(12) United States Patent
Muntz et al.

(10) Patent No.: US 7,774,611 B2
(45) Date of Patent: Aug. 10, 2010

(54) ENFORCING FILE AUTHORIZATION ACCESS

(75) Inventors: Daniel A. Muntz, Cupertino, CA (US); Zheng Zhang, San Jose, CA (US); Baila Ndiaye, Santa Clara, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1981 days.

(21) Appl. No.: 10/138,644

(22) Filed: May 6, 2002

(65) Prior Publication Data
US 2003/0208681 A1 Nov. 6, 2003

(51) Int. Cl.
*G06F 21/00* (2006.01)

(52) U.S. Cl. .......................... 713/182; 726/2; 713/185

(58) Field of Classification Search .................. 707/1, 707/203; 709/227; 713/182; 726/2
See application file for complete search history.

(56) References Cited

U.S. PATENT DOCUMENTS

| | | | |
|---|---|---|---|
| 5,048,085 A * | 9/1991 | Abraham et al. ............ 713/159 |
| 6,032,216 A * | 2/2000 | Schmuck et al. ............ 710/200 |
| 6,122,631 A * | 9/2000 | Berbec et al. ................. 707/9 |
| 6,272,631 B1 * | 8/2001 | Thomlinson et al. ........ 713/155 |
| 6,356,941 B1 * | 3/2002 | Cohen ........................ 709/219 |
| 6,502,193 B1 * | 12/2002 | Barber .......................... 726/4 |
| 7,028,191 B2 * | 4/2006 | Michener et al. ............ 713/182 |
| 7,395,435 B2 * | 7/2008 | Benhammou et al. ....... 713/185 |
| 7,444,414 B2 * | 10/2008 | Foster et al. ................ 709/229 |
| 2002/0038348 A1 * | 3/2002 | Malone et al. .............. 709/217 |
| 2003/0028600 A1 * | 2/2003 | Parker ........................ 709/206 |
| 2003/0196114 A1 * | 10/2003 | Brew et al. .................. 713/201 |

* cited by examiner

*Primary Examiner*—Farid Homayounmehr

(57) ABSTRACT

A method and system of enforcing file authorization access. The method may include generating an authorization combination at a metadata server and encrypting the authorization combination. The authorization combination may include a block combination including a block list for accessing user requested data from a storage server system and an authorization prefix. The authorization prefix may indicate at least one operation which the user requesting data access is authorized to perform. The method may further include receiving the encrypted authorization combination at the storage server, and decrypting the encrypted authorization combination to recover the block list for retrieving the user requested data.

12 Claims, 6 Drawing Sheets

ENFORCING FILE AUTHORIZATION ACCESS

FIELD OF THE INVENTION

The invention is generally related to storage systems. More particularly, the invention is related to retrieval of data from a block based storage system.

BACKGROUND OF THE INVENTION

The development of systems using and storing large amounts of data has lead to many approaches for storage and access of data. One approach includes a client/server file system protocol where clients may interact directly with storage servers. The clients interact with these storage servers using block lists. Block lists describe actual physical sectors on a memory resource, allowing a storage server to handle the actual data transfer to and from a file system resource.

In this approach, a client may access data by first obtaining a block list from a metadata server, and then using this block list to read and write data directly to a storage server. A client is a computer that is allowed to access networked file services provided by the storage node. Existing implementations, including the above-outlined approach, rely on trusted networks, trusted clients and trusted metadata servers. Thus, there is no verification of a client's authority to use a given block list, no validation that the block list was issued by an authorized metadata server, and block lists are transmitted over a network in plain text.

SUMMARY OF THE INVENTION

According to embodiments of the invention, a method and system of enforcing file authorization access is described. The method may include generating an authorization combination at a metadata server and encrypting the authorization combination. The authorization combination may include a block combination including a block list for accessing user requested data from a storage server system and an authorization prefix. The authorization prefix may indicate at least one operation which the user requesting data access is authorized to perform. The method may further include receiving the encrypted authorization combination at the storage server, and decrypting the encrypted authorization combination to recover the block list for retrieving the user requested data.

BRIEF DESCRIPTION OF THE DRAWINGS

The invention is illustrated by way of example and not limitation in the accompanying figures in which like numeral references refer to like elements, and wherein.

DETAILED DESCRIPTION OF THE INVENTION

The invention includes a method and system of enforcing file authorization access. In the following detailed description, numerous specific details are set forth in order to provide a thorough understanding of the invention. However, it will be apparent to one of ordinary skill in the art that these specific details need not be used to practice the invention. In other instances, well-known structures, interfaces and processes have not been shown in detail in order not to obscure unnecessarily the invention.

Figure 1:
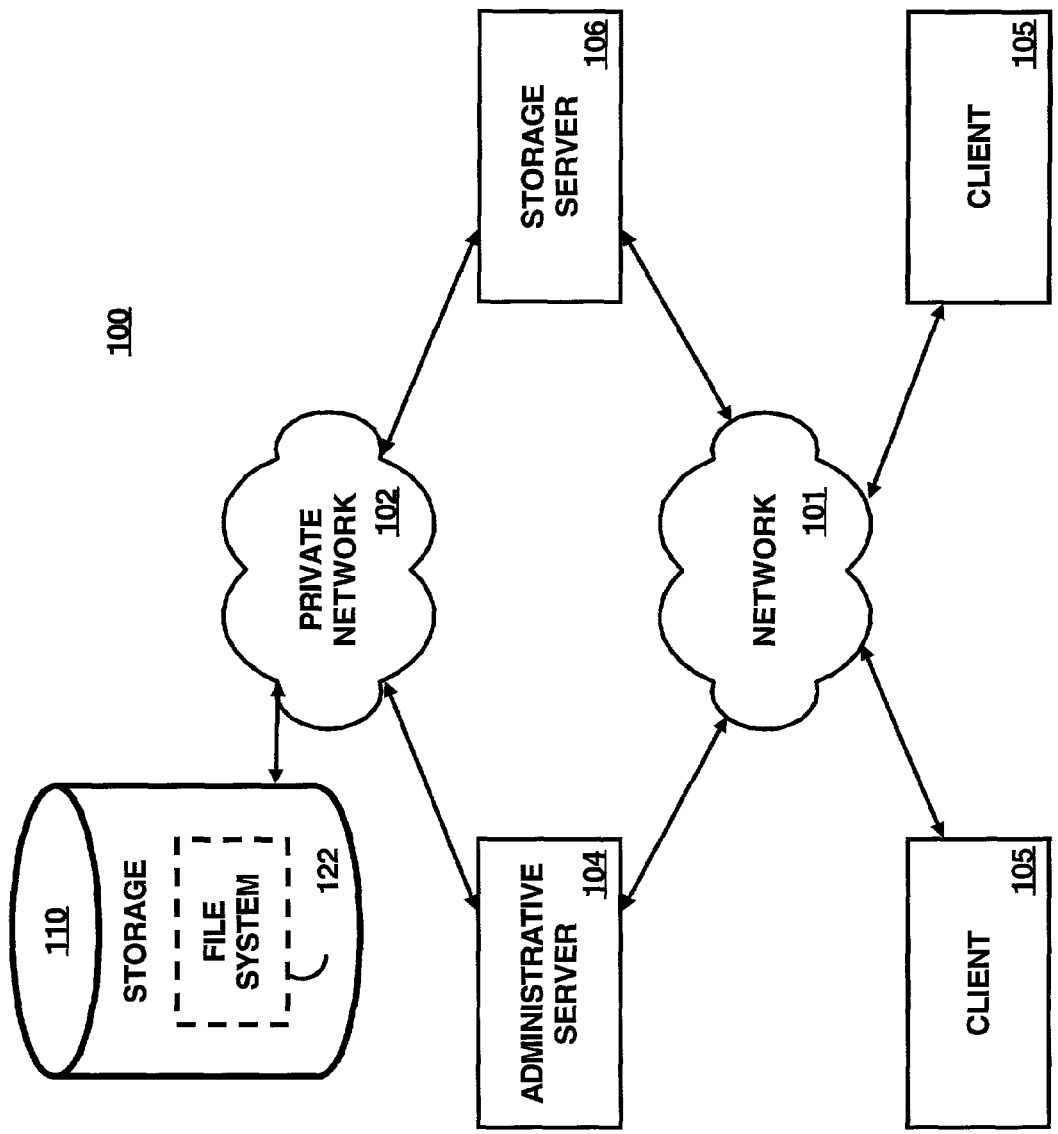
FIG. 1 is a network diagram illustrating a block storage-based system using an embodiment of the invention.

FIG. 1 is a network diagram illustrating an embodiment of a block storage based system 100 using a file or pull authorization access mechanism. Block storage based system 100 may include a storage resource 110 which may be coupled to a administrative server 104 and a storage server 106 through a private network 102. Administrative server 104 and storage server 106 may also be coupled to a network 101. Administrative server 104 and storage server 106 may communicate over private network 102.

Clients 105 may include computers or computer systems that are allowed to access networked file services provided by a storage node, such as the group including administrative server 104, storage server 106 and storage resource 110. Clients 105 may access the networked file services through administrative server 104 and storage server 106.

Servers 104 and 106 include complementary processes for handling concurrent input/output requests from clients 105 for file system resource 122 on storage resource 110.

Figure 2:
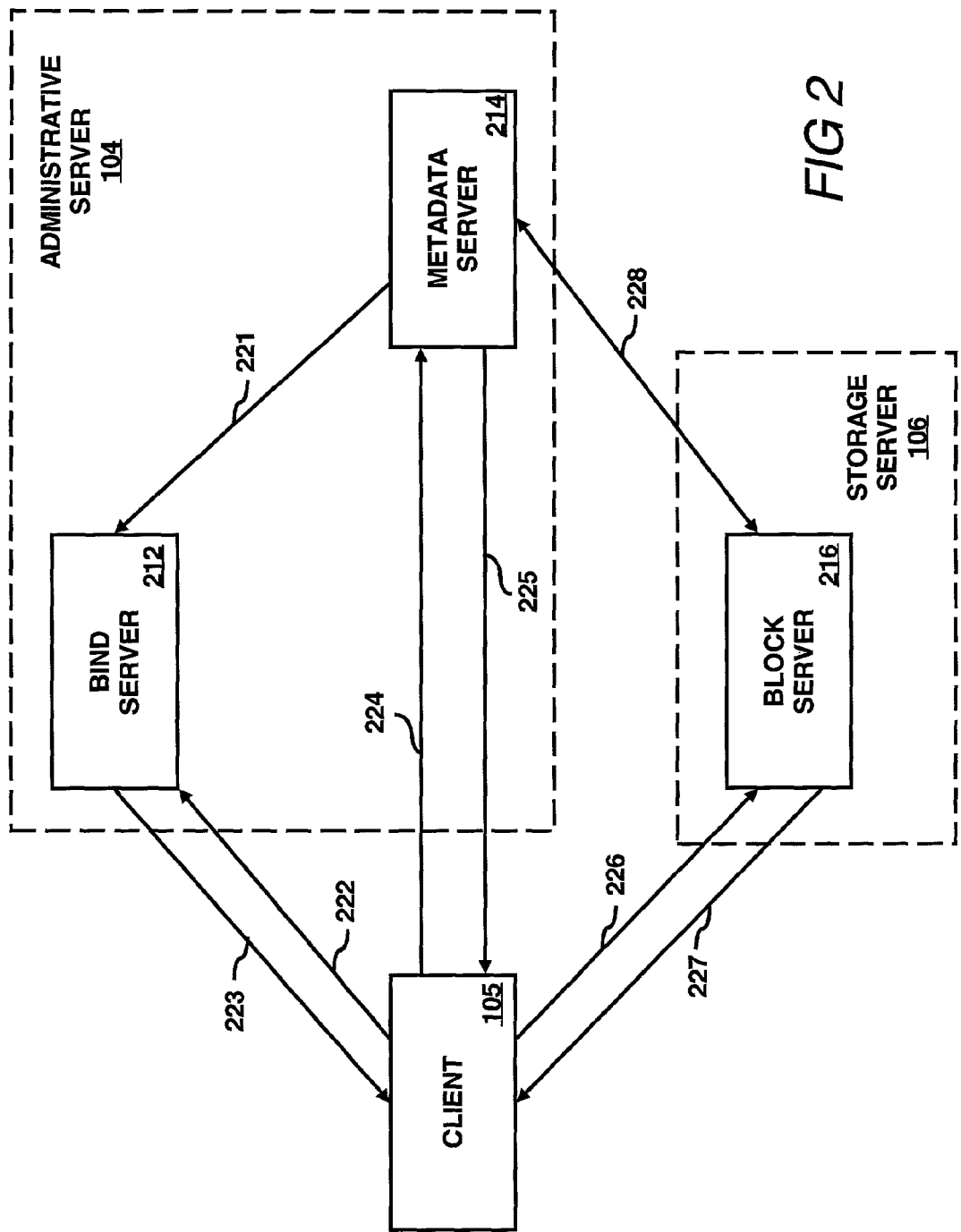
FIG. 2 is a block diagram illustrating an embodiment of the flow of data between a client and a storage system.

FIG. 2 is a block diagram illustrating an embodiment of the flow of data in the block base storage system of FIG. 1. As shown in FIG. 2, administrative server 104 may include a bind server 212 and a metadata server 214, while storage server 106 may include a block server 216. Thus, storage system 100 may include bind server 212, metadata server 214 and block server 216. The client 105, storage server 106, and metadata server 214 and can include computer readable media containing executable instructions which, when executed in the corresponding system, perform certain tasks as described below. The computer readable media include memory or disk-based storage media.

In operation, each time client 105 makes a new file access request, bind server 212 may locate the metadata server 214 responsible for the requested file and communicate the location to client 105. In one embodiment, files may be stored in a tree structure and bind server 212 may locate metadata server 214 responsible for the sub-tree of the requested file. Metadata server 214 may contain the file and file system attributes associated with the requested sub-tree.

Block server 216 may handle the client read/write requests. Block server 216 may contain actual data files. Metadata server 214 may store locations of the data on block server 216, as well as access rights specifying which users may read or write to each file. Each file system 122 may be assigned to be maintained by a specific metadata server 214. Metadata server 214 may also maintain a list of credentials for each user, defined by the administrator of the storage system. Metadata server 214 may verify a user's credentials based on his claimed identify, although metadata server 214 may not authenticate each user. Authentication of the users making file requests may be performed by client 105.

Arrow 221 illustrates metadata server 214 making a file system 122 tree structure available to bind server 212. This may be done when file system 122 is added to metadata server 214, or when metadata server 214 is associated with storage system 100.

At arrow 222, client 105 may make a read/write request to administrative server 104. The request may be directed to bind server 212. Bind server 212 may locate metadata server 214 responsible for a sub-tree associated with the requested data. At arrow 223, bind server 212 may transmit information regarding metadata server 214 to client 105.

At arrow 224, client 105 may transmit its request to indicated metadata server 214. At arrow 225, metadata server 214 may return a block list including a validation mechanism to client 105. In one embodiment, the validation mechanism may include a token including credentials for the requested access. The token will be described further below with respect to FIGS. 3-5.

At arrow 226, client 105 may transmit the token and the block list received from metadata server 214 to block server 216. Block server 216 may then determine if the access requested by client 105 is appropriate, and return the requested data at arrow 227 if the requested access is appropriate.

Arrow 228 represents key negotiation that may occur between block server 216 and metadata server 214 for decrypting the token generated by metadata server 214.

Figure 3:
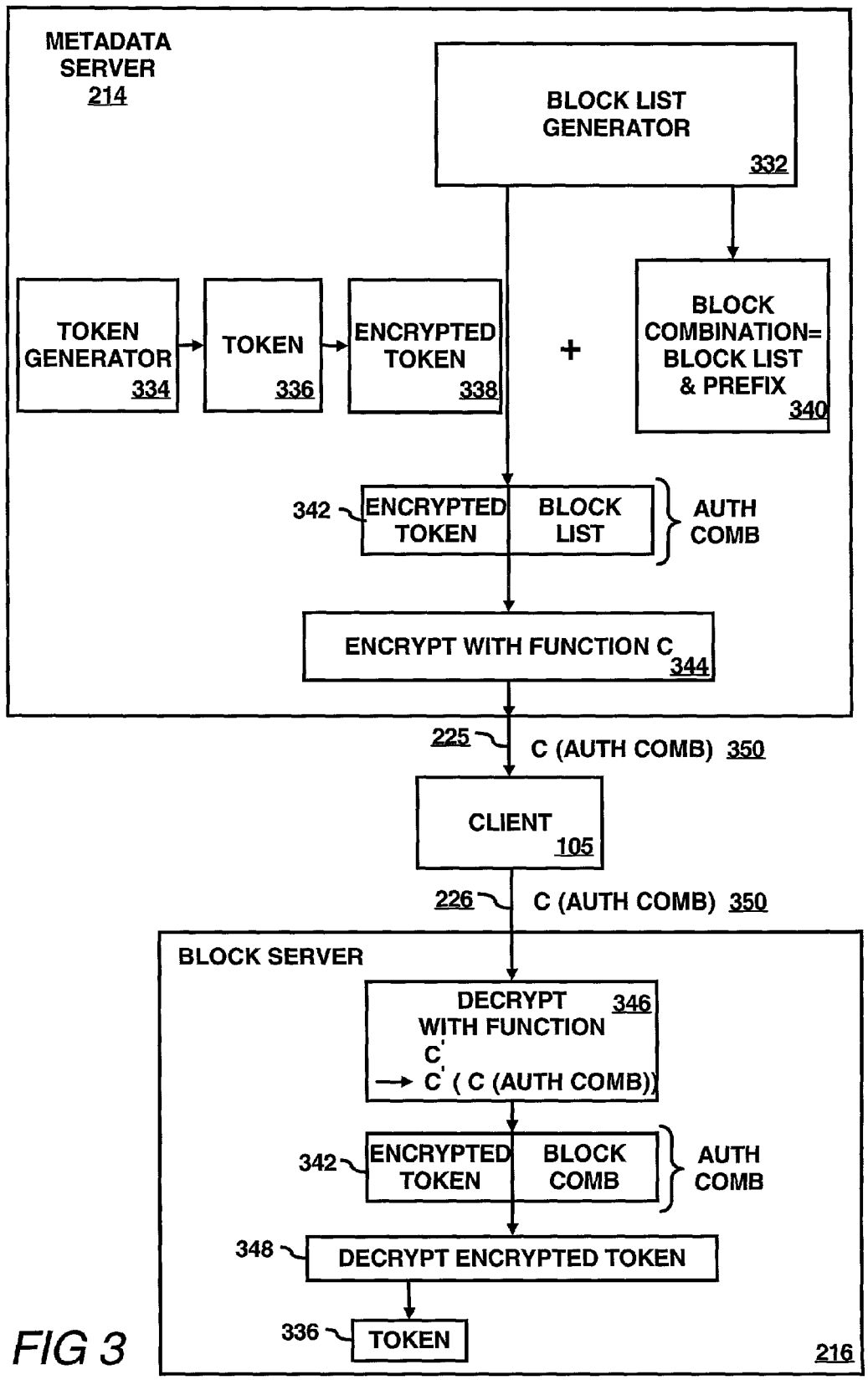
FIG. 3 is a block diagram illustrating an embodiment of a mechanism for securing block lists in the system of FIG. 1.

FIG. 3 is a block diagram illustrating the operation of the file authorization access mechanism, according to an embodiment of the invention. Metadata server 214 may include block list generator 332, token generator 334 and encryption block 344. Block server 216 may include decryption block 346.

At metadata server 214, block list generator 332 may generate block combination 340. Block combination 340 may include the block list for the requested data and an authorization prefix indicating the operations which the user requesting data access is authorized to perform. Token generator 334 may generate a token 336 containing credentials, such as operation type(s) authorized for the client (or privilege) for the current requested operation, associated block lists, and the like. Precise content of token 336 may be customized. In one embodiment, token 336 may include privilege, validity period, authority signature and beneficiary. Token 336 may also include a time stamp to indicate the validity period. Token 336 may be re-stamped at every lease period by metadata server 214. In one embodiment, a network time protocol ("NTP") may be used to synchronize the different clients.

Token 336 may be encrypted at encryption block 338 and added to block combination 340. In one embodiment, the encryption block 338 may include an encryption module. The combination of block combination 340 and encrypted token 338 may form authorization combination ("AUTH COMB") 342. AUTH COMB 342 may then be encrypted at encryption block 344. In one embodiment, encryption block 344 may include an encryption module. The encryption module associated with encryption block 344 may be the same as the encryption module associated with encryption block 338.

In one embodiment, AUTH COMB 342 may be encrypted with a function C. The authorization prefix may include a capability depending on the client request. For example, if client 105 is authorized to perform a given operation, the client's authority to perform the operation (i.e., the capability) is attached to the block list to form block combination 340. A sample implementation may be to prefix the block list with an R if the client requests Read Access to the file, a prefix of W for a Write Access, and a prefix of RW for mixed access, etc. Block server 216 may have a decoding function C' to recover AUTH COMB 342.

At arrow 225, encrypted AUTH COMB, C (AUTH COMB) 350, may be transmitted to client 105. In one embodiment, client 105 may not have any knowledge about the content of token 336, and client 105 may not have the secret key to decrypt encrypted token 338. However, clients 105 may be able to decrypt C (AUTH COMB) (i.e., the first encryption level). By decrypting AUTH COMB 342, client 105 may verify the authenticity of the origin (i.e., metadata server 214) and obtain the block list from block list combination 340.

At arrow 226, client 105 may forward C (AUTH COMB) to block server 216 if metadata server 214 is successfully authenticated. Block server 216 may decrypt C (AUTH COMB) with function C' at decryption block 346 to generate AUTH COMB 342. In one embodiment, decryption block 346 may comprise a decryption module.

At decryption block 346, block server 216 may decrypt encrypted token 338. The secret key (or session key) used to encrypt token 336 may be shared between block server 216 and metadata server 214. Servers 214, 216 may negotiate the session key and the security parameters associated with it (e.g., algorithms, life time, etc.). Block server 216 may authenticate client 105, using the negotiated key to decrypt the encrypted token 338 and recover token 336 at decryption block 348. In one embodiment, decryption block 348 may include a decryption module. In one embodiment, the decryption module associated with decryption block 348 may be the same as the decryption module associated with decryption block 346.

Block server 216 may check if the information presented by client 105 matches the one specified in token 336 by metadata server 214. If the information presented by client 105 matches the information in token 336, block server 216 may satisfy the client request by transmitting the requested data to client 105. If the client information does not match the information in token 336, block server 216 may reject the client request.

Figure 4:
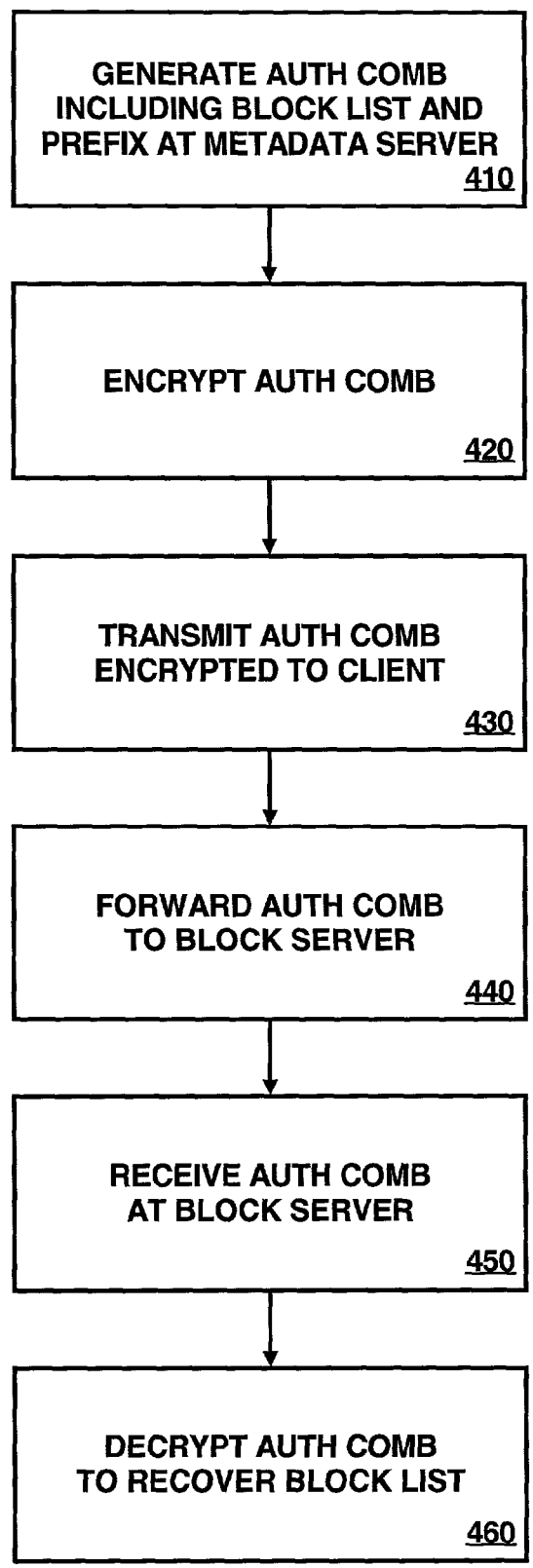
FIG. 4 is a flow diagram illustrating an embodiment of a method for securing block lists.

FIG. 4 is a flow diagram illustrating one embodiment of a method for enforcing file authorization access in a block based storage system 100. At step 410, metadata server 214 may generate an AUTH COMB 342. As described above, AUTH COMB 342 may include a block combination 340 and an encrypted token 338. Block combination 340 may include a block list associated with the data access request and a prefix indicating the operation(s) which the user requesting data access is authorized to perform.

In one embodiment, metadata server 214 may receive the data access request from the user through client system 105. Metadata server 214 may authenticate client 105. Although metadata server 214 may maintain a list of credentials for each user, defined by the administrator, metadata server 214 may verify the user's credentials based on the user's claimed identity. However, client 105 may authenticate the users making file requests through client 105.

Client 105 may authenticate the user using a user-to-host security mechanism, such as a password, secure hash password (where the user knows his password while the system knows the hash password), certificates or ticket. Metadata server 214 and client 105 may authenticate each other using host-to-host authentication. The connection between metadata server 214 and client 105 may be accepted if the authentication phase is successful.

If metadata server 214 finds that client 105 has passed the authentication phase, metadata server 214 may examine the client's request to read or write the data of a file of file system 122. This phase is the authorization phase. If metadata server 214 finds that the user requesting to read or write the data has authorization to perform the requested operation(s), metadata server 214 may generate AUTH COMB 342.

In one embodiment, client 105 may first send the data access request to bind server 212. Future accesses to an already-referenced file may not require the participation of bind server 212.

At step 420, metadata server 214 may encrypt AUTH COMB. At step 430, metadata server 214 may transmit encrypted AUTH COMB 342 to client 105.

At step 440, client 105 may forward C(AUTH COMB) 350 to block server 216. Forwarding C(AUTH COMB) 350 may include decrypting C(AUTH COMB) 350 to recover AUTH COMB 342 in order to verify the authenticity of metadata server 214. If authentication of metadata server 214 by client 105 is successful, client 105 may transmit C(AUTH COMB) 350 to block server 216.

At step 450, block server 216 may receive C(AUTH COMB) 350. At step 460, block server 216 may decrypt C(AUTH COMB) 350 to recover block combination 340 including the block list and prefix. The block list may be used by block server 216 to retrieve the data requested by client 105.

Figure 5A:
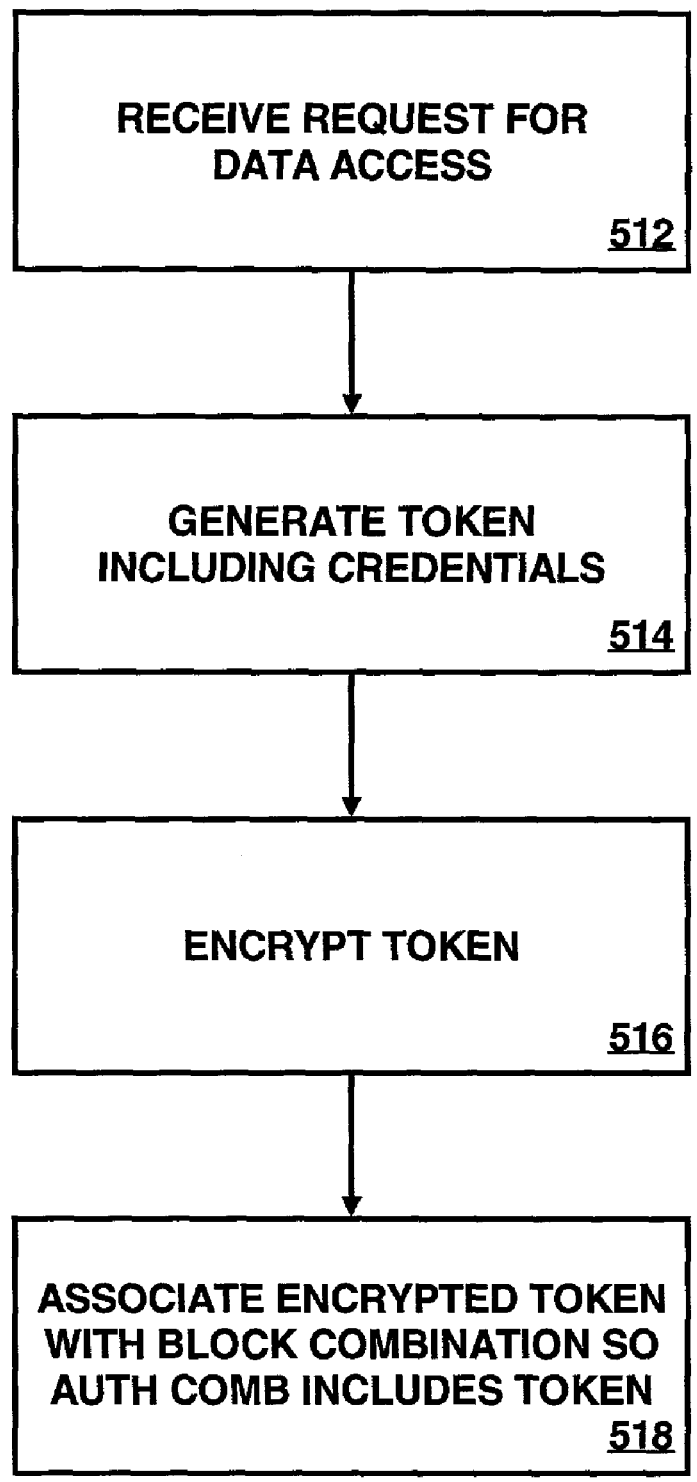
FIGS. 5A and B are flow diagrams illustrating embodiments for verifying a client's authority to use a given block list.
Figure 5B:
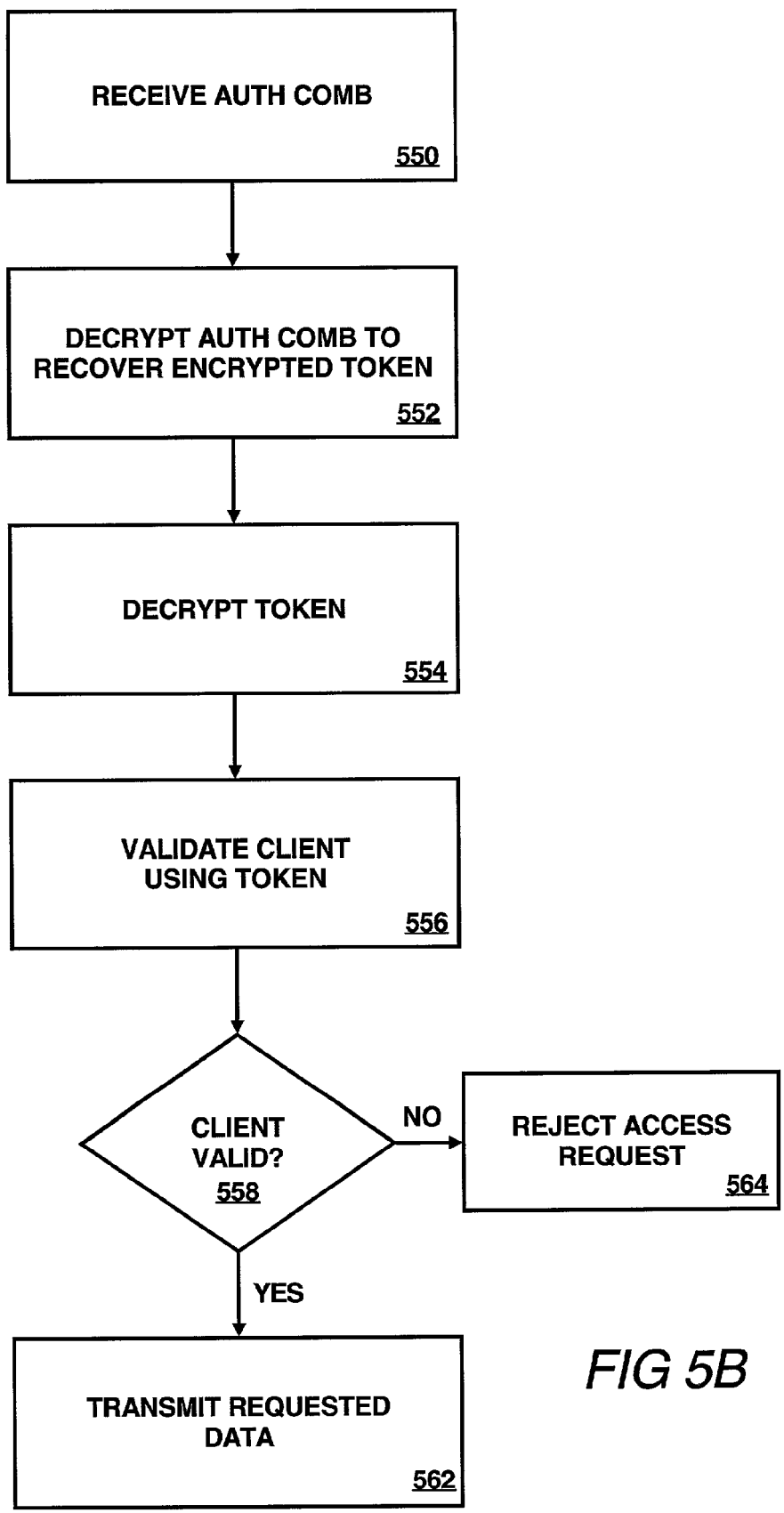

FIGS. 5A and 5B are flow diagrams describing embodiments of methods for using token 336 for authenticating clients requesting access to data stored in block based storage system 100.

At step 512 of FIG. 5A, metadata server 214 may receive a request for data access from client 105. At step 514, metadata server 214 may generate token 336 including credentials for the user at client 105 requesting the data. At step 516, metadata server 214 may encrypt token 336. At step 518, metadata server 214 may associate encrypted token 338 with block combination 340. Thus, AUTH COMB 342 may include encrypted token 338 as well as block combination 340. Token 336 may be encrypted at step 516 using a secret session key shared by metadata server 214 and block server 216. In one embodiment, block server 216 and metadata server 214 may negotiate the session key and the security parameters associated with the session key. Metadata server 214 may also time stamp token 336 at step 514 to indicate the validity period of access for the data access requested by the user at client 105. The credential information included in token 336 may be maintained by metadata server 214. Metadata server 214 may also use the credential information to verify user submitted credentials and generate token 336.

FIG. 5B illustrates the process performed at block server 216. At step 550, block server 216 may receive C(AUTH COMB) 350. At step 552, block server 216 may decrypt C(AUTH COMB) 350 to recover encrypted token 338. At step 554, block server 216 may decrypt encrypted token 338 to recover token 336. At step 556, block server 216 may validate client 105 using token 336, as described above with reference to FIG. 3. At step 558, block server 216 will determine whether client 105 is valid. If client 105 is valid, block server 216 may transmit the requested data to client 105. If client 105 is not valid, block server 216 may reject the access request at step 564.

What has been described and illustrated herein is a preferred embodiment of the invention along with some of its variations. The terms, descriptions and figures used herein are set forth by way of illustration only and are not meant as limitations. Those skilled in the art will recognize that many variations are possible within the spirit and scope of the invention, which is intended to be defined by the following claims—and their equivalents—in which all terms are meant in their broadest reasonable sense unless otherwise indicated.

What is claimed is:

1. A method of enforcing file authorization access, comprising:
   receiving, at a client computer, an encrypted authorization combination from a metadata server, the authorization combination comprising a block combination including a block list for accessing client requested data from a storage server system and an authorization prefix, the authorization prefix indicating at least one operation which the client computer is authorized to perform, wherein the authorization prefix is assigned a first value to indicate read access, a second value to indicate write access, and a third value to indicate mixed read and write access;
   transmitting, by the client computer, the encrypted authorization combination to the storage server system; and
   receiving the client computer requested data from the storage server system in response to the storage server system decrypting the encrypted authorization combination to recover the block list for retrieving the client requested data,
   wherein receiving the encrypted authorization combination comprises receiving the encrypted authorization combination that further comprises an encrypted token, the token including credentials for accessing the client requested data, and the token being encrypted using a session key shared by the metadata server and the storage server system, wherein the session key is unknown to the client computer so that the client computer is unable to decrypt the encrypted token.

2. The method of claim 1, further comprising negotiating the session key and security parameters associated with the session key between the metadata server and the storage server system.

3. The method of claim 1, further comprising decrypting the encrypted token at the storage server system to validate the client; and transmitting, from the storage server system to the client, the client requested data in response to the client being validated.

4. A method of enforcing file authorization access, comprising:
   receiving, by a storage server computer from a client, an encrypted authorization combination for a requested data access by the client, wherein the authorization combination was encrypted at a metadata server and sent from the metadata server to the client, the encrypted authorization combination comprising a block list and an encrypted token, the encrypted token including credentials for the requested data access, wherein the encrypted token is encrypted using a session key negotiated between the storage server computer and the metadata server, and wherein the session key is unknown to the client to prevent the client from decrypting the encrypted token;
   decrypting, by the storage server computer, the encrypted authorization combination to recover the block list and the encrypted token; and
   decrypting, by the storage server computer, the encrypted token using the session key to recover the token to authenticate a user associated with the client.

5. The method of claim 4, further comprising the storage server negotiating with the metadata server to retrieve a key to decrypt the encrypted token.

6. A system of enforcing file authorization access, comprising:
   a metadata server computer comprising a block list generator, a token generator and at least one encryption module, the block list generator configured to generate a block list for accessing user requested data from a storage server system, the token generator configured to generate a token including credentials for the requested data access, and the at least one encryption module configured to encrypt the token and an authorization combination including the block list and the encrypted token, wherein the token is encrypted using a session key; and a storage server computer comprising at least one decryption module, the at least one decryption module configured to decrypt the authorization combination to recover the token to authenticate the user, wherein the decryption module is configured to further decrypt the encrypted token using the session key, and wherein the storage server computer is configured to:
receive the encrypted authorization combination from a client that received the encrypted authorization combination from the metadata server computer; and
negotiate the session key with the metadata server computer, wherein the session key is unknown to the client to prevent the client from decrypting the encrypted token.

7. A computer readable medium containing executable instructions which, when executed in a storage server computer, cause the storage server computer to perform a method comprising:
negotiating a session key with a metadata server;
receiving from a client seeking to access data at the storage server computer, an encrypted authorization combination for a user requested data access, wherein the authorization combination was encrypted at the metadata server and received by the client from the metadata server, the encrypted authorization combination comprising a block list and an encrypted token, the encrypted token including credentials for the requested data access, and the encrypted token encrypted using the session key;
decrypting the encrypted authorization combination to recover the block list and the encrypted token; and
decrypting the encrypted token using the session key to recover the token to authenticate a user associated with the client, wherein the session key is unknown to the client to prevent the client from decrypting the encrypted token.

8. A method of enforcing file authorization access, comprising:
generating an authorization combination at a metadata server computer, the authorization combination comprising a block combination including a block list for accessing user requested data from a storage server system and an authorization prefix, the authorization prefix indicating at least one operation which a user requesting data access is authorized to perform, wherein the authorization prefix is assigned a first value to indicate read access, a second value to indicate write access, and a third value to indicate mixed read and write access;
encrypting the authorization combination at the metadata server computer;
transmitting, by the metadata server computer, the encrypted authorization combination to a client hosting the user;

the metadata server computer negotiating with the storage server system to provide a key to the storage server system to enable the storage server system to decrypt at least a portion of the encrypted authorization combination received by the storage server system from the client; and
generating an encrypted token at the metadata server computer for inclusion in the authorization combination, the token including credentials for the access of user requested data, wherein the token is encrypted using the key negotiated between the metadata server computer and storage server system, and wherein the key is unknown to the client to prevent the client from decrypting the encrypted token.

9. The method of claim 8, wherein the key provided to the storage server system by the metadata server is used to decrypt the encrypted token.

10. The method of claim 8, further comprising time stamping the token at the metadata server to indicate a validity period of the access.

11. The method of claim 8, further comprising maintaining user credential information at the metadata server and using the user credential information to verify user submitted credentials and generate the token.

12. A system of enforcing file authorization access, comprising:
a metadata server computer comprising a block list generator and at least one encryption module, the block list generator configured to generate a block combination including a block list for accessing user requested data from a storage server system and an authorization prefix, wherein the authorization prefix indicates at least one operation which the user requesting data access is authorized to perform, the block combination is included in an authorization combination, wherein the authorization combination further includes an encrypted token encrypted using a session key, and the at least one encryption module is configured to encrypt the authorization combination, and wherein the metadata server computer is configured to send the authorization combination to a client; and
a storage server computer comprising at least one decryption module, the at least one decryption module configured to decrypt the authorization combination to recover the block list for retrieving the user requested data, wherein the storage server computer is configured to:
receive the encrypted authorization combination from the client that seeks to access data at the storage server computer; and
negotiate the session key with the metadata server computer, wherein the session key is unknown to the client to prevent the client from decrypting the encrypted token.

* * * * *